Aug. 24, 1948.   W. W. SINGLETON ET AL   2,447,620
METHOD OF FORMING A MOLD

Filed Aug. 24, 1945   3 Sheets-Sheet 1

INVENTOR.
WILLIAM W. SINGLETON
BY DON E. DASHER
Martin J. Finnegan
ATTORNEY

Aug. 24, 1948.  W. W. SINGLETON ET AL  2,447,620
METHOD OF FORMING A MOLD
Filed Aug. 24, 1945  3 Sheets-Sheet 2
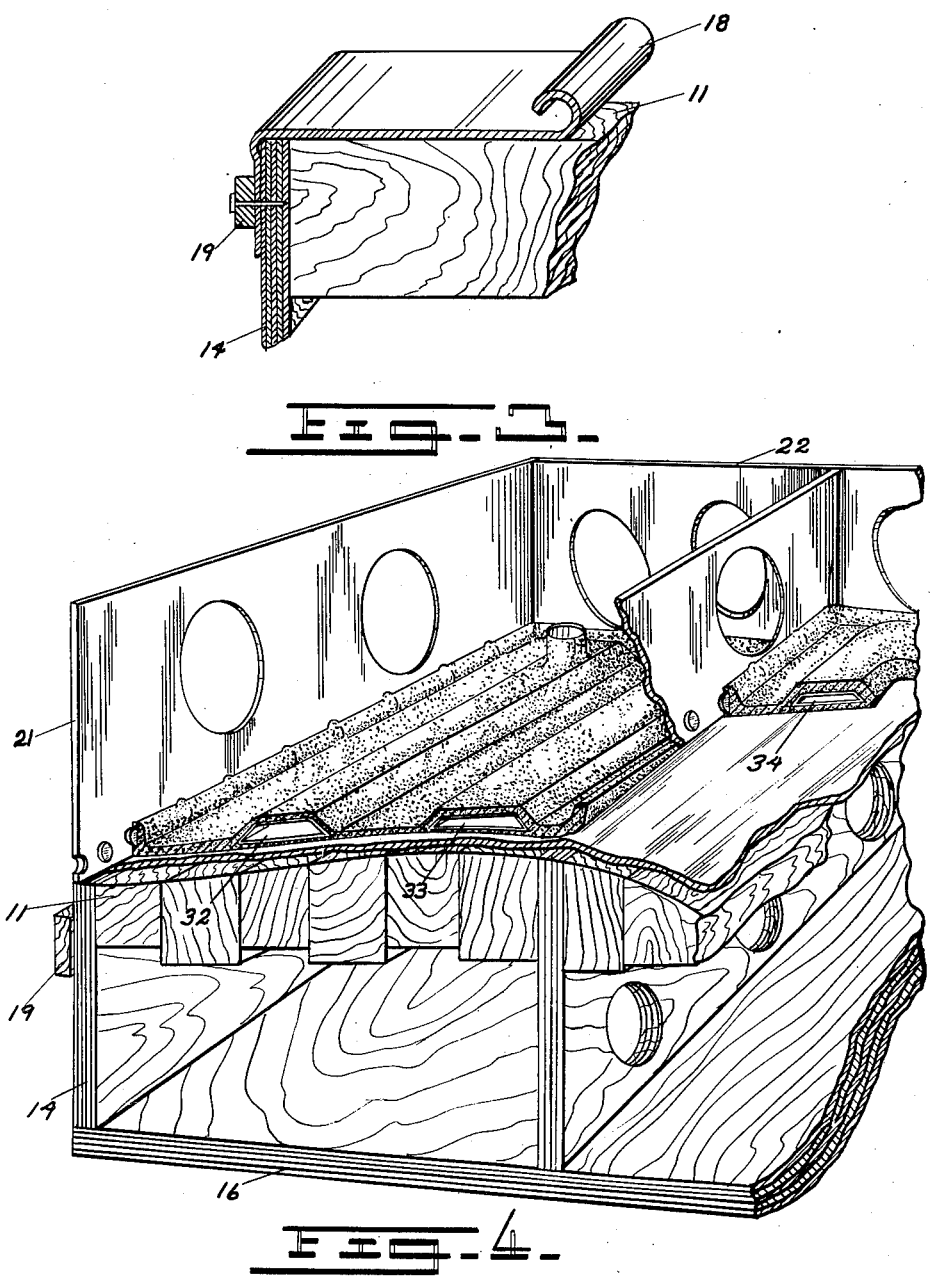
INVENTOR.
WILLIAM W. SINGLETON
BY DON E. DASHER
Martin J. Finnegan
ATTORNEY Aug. 24, 1948.  W. W. SINGLETON ET AL  2,447,620
METHOD OF FORMING A MOLD Filed Aug. 24, 1945  3 Sheets-Sheet 3

INVENTOR.
WILLIAM W. SINGLETON
BY DON E. DASHER

Martin J. Finnegan
ATTORNEY

Patented Aug. 24, 1948

2,447,620

UNITED STATES PATENT OFFICE 2,447,620

METHOD OF FORMING MOLDS

William W. Singleton and Don E. Dasher, Detroit, Mich., assignors to Bendix Aviation Corporation, Detroit, Mich., a corporation of Delaware Application August 24, 1945, Serial No. 612,496

1 Claim. (Cl. 76—107)

This invention relates to molding apparatus, and particularly to the production of a mold having surfaces of multi-directional curvature.

An object of the invention is to provide a novel method of producing a metal-surfaced mold.

Another object is to provide a metal mold of novel construction.

A further object is to provide a mold having novel heat dissipating means integrated therewith.

Other objects of the invention will appear upon examination of the following description of the preferred embodiment of the invention, as illustrated in the accompanying drawings. The scope of the invention, as defined in the appended claim, includes this and other embodiments and modifications suggested by the disclosure herein contained.

In the drawings:

Fig. 3 is a sectional view of a corner of the assembly of Fig. 2;

Fig. 4 is a sectional view of the assembly after addition of the metal frame, heat transfer ducts, and sprayed metal;

Figure 1:
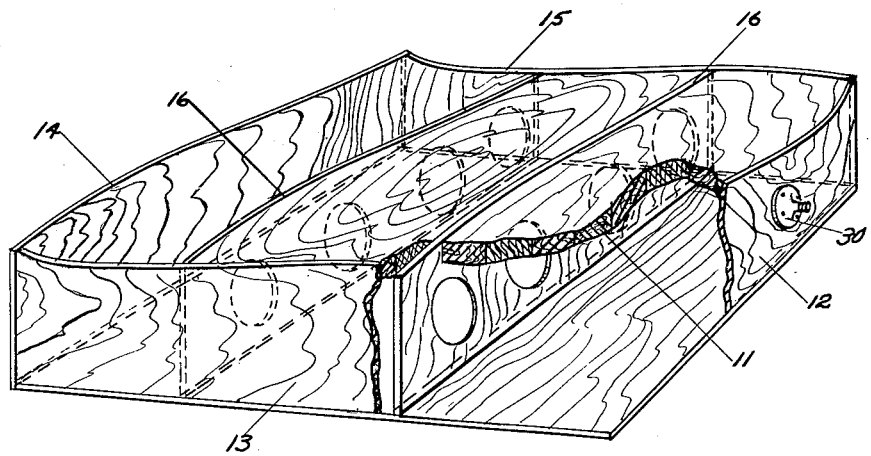
Fig. 1 shows a hollow wooden structure which is first prepared, as the first stage in the production of the finished mold.
Figure 2:
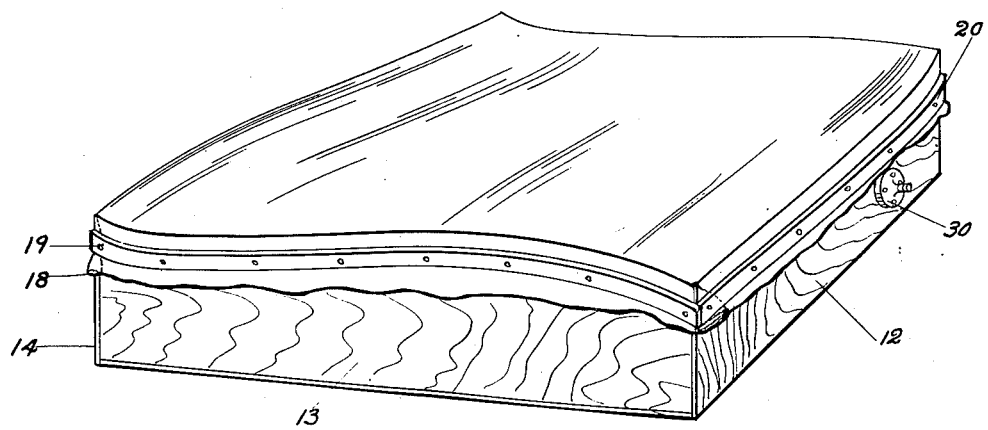
Fig. 2 shows the same structure after addition of the flexible metallic covering sheet.
Figure 5:
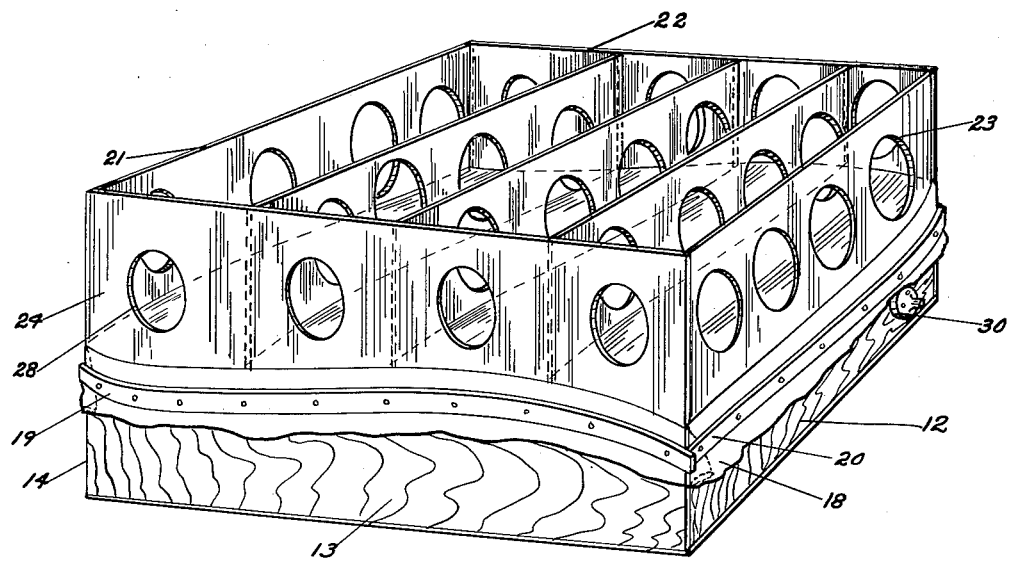
Fig. 5 is an exterior view of the assembly of Fig. 4.

As indicated, there is first constructed a floor of sap-free lumber, in the form of strips of pine or the like, not more than three inches thick, the strips being laid one against the other and suitably secured to form the floor, as shown at 11. This surface is then worked with cutting tools to produce the desired multi-directional contour, as shown—or, if preferred, each strip may be so worked, and then the successive strips brought together. This may be a part of the solid wood model.

To the floor 11 there is then added a surrounding set of walls 12, 13, 14, and 15, constructed preferably of plywood, and including one or more partitions 16, the walls and partitions having apertures to permit evacuation of all air from the chambers formed thereby, as well as from the pores of the wood floor 11. The walls are straight along their lower edges, but contoured at their upper edges to match the contours of the upper surface of floor 11.

Next, there is applied a thin sheet 18 of lead foil or the like, entirely covering the outer contoured surface of floor 11, and overlapping the side walls 12, 13, 14 and 15. Batten strips 19, 20 are nailed over the skirt portion of the sheet 18 to secure it tightly over the floor surface.

Figure 6:
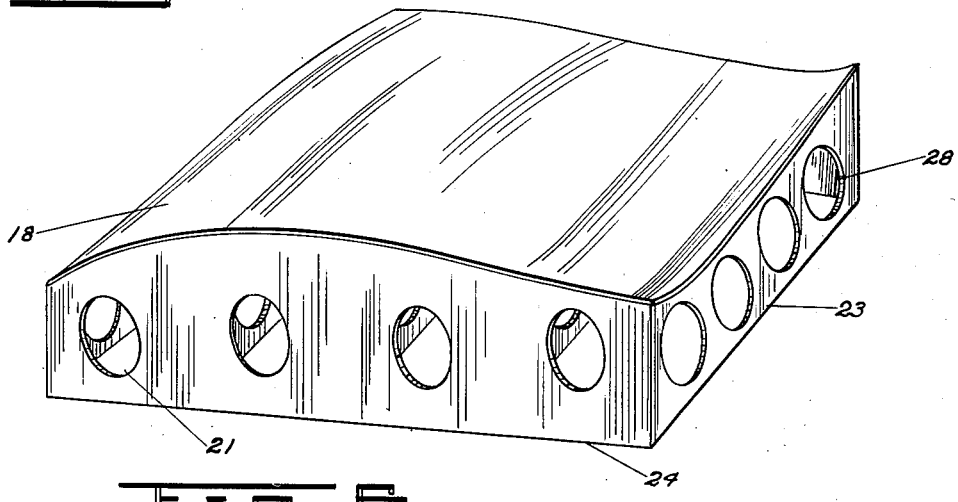
Fig. 6 shows the external appearance of the completed mold, that is, after removal from the hollow wooden base shown in Figs. 1 to 5.

There is then applied a set of rigid metallic sheets 21, 22, 23, 24 welded at their joining edges to form a rigid super-structure which eventually becomes the wall structure of the completed mold, as shown in Fig. 6. These sheets are perforated, as at 28, for a purpose to appear.

The mold is now ready for the application of metal to the surface of sheet 18, and to the inner surfaces of the walls 21 to 24. The metal is applied in liquid spray form, after the wood has been completely freed of air pockets by the application of a vacuum hose to fitting 30 (Fig. 1). After the metallic coating builds up, to a suitable depth, a piping system 32, 33, 34, 35 is laid in place, and the spraying is then resumed and continued until the desired depth is attained. The metal, during this spraying operation, flows around projections—thus binding itself to the side walls. The wooden parts are then removed, and the mold is complete, as shown in Fig. 6; the skirt portion of the lead sheet having also been removed.

Having thus described the various features of the invention, what we claim as new and desire to secure by Letters Patent is:

The method of forming a mold having a surface curved in one or more directions comprising first preparing a box-like frame, including in said frame a flooring of desired contour, covering said flooring with a thin flexible sheet to which sprayed metal may adhere, extending the sides of said frame beyond the level of said flooring, spraying metal within said extended sides to cover said flexible sheet to any desired depth, superimposing upon the sprayed metal a system of conduits for the circulation of cooling fluid, and continuing the spraying of the metal over said conduits to integrate the latter with the resulting metal block.

WILLIAM W. SINGLETON.
        DON E. DASHER.

REFERENCES CITED

The following references are of record in the file of this patent:

UNITED STATES PATENTS

| Number | Name | Date |
|---|---|---|
| 567,030 | Kelsey et al. | Sept. 1, 1896 |
| 630,771 | Blackwell | Aug. 8, 1899 |
| 1,850,141 | Rosenqvist | Mar. 22, 1932 |
| 1,866,790 | Bateman | July 12, 1932 |
| 1,912,889 | Couse | June 6, 1933 |
| 1,913,747 | Copeman | June 13, 1933 |
| 1,935,916 | Ragsdale | Nov. 21, 1933 |
| 1,950,604 | FitzGerald | Mar. 13, 1934 |
| 2,213,237 | Brennan et al. | Sept. 3, 1940 |
| 2,256,247 | Groehn | Sept. 16, 1941 |
| 2,289,262 | Groehn | July 7, 1942 |
| 2,293,571 | Stossel | Aug. 18, 1942 |
| 2,317,597 | Ford et al. | Apr. 27, 1943 |
| 2,420,359 | Dasher | May 13, 1947 |